US012696338B2

(12) United States Patent
Liu et al.

(10) Patent No.: US 12,696,338 B2
(45) Date of Patent: Jul. 28, 2026

(54) WIRELESS CELL ACTIVATION AND DEACTIVATION

(71) Applicant: ZTE Corporation, Shenzhen (CN)

(72) Inventors: Jing Liu, Shenzhen (CN); He Huang, Shenzhen (CN); Jianxun Ai, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 444 days.

(21) Appl. No.: 18/164,528

(22) Filed: Feb. 3, 2023

(65) Prior Publication Data

US 2023/0189383 A1 Jun. 15, 2023

Related U.S. Application Data

(63) Continuation of application No. PCT/CN2020/106537, filed on Aug. 3, 2020.

(51) Int. Cl.

*H04W 76/20* (2018.01)
*H04W 24/10* (2009.01)
*H04W 74/0833* (2024.01)
*H04W 74/0838* (2024.01)

(52) U.S. Cl.

CPC ........... *H04W 76/20* (2018.02); *H04W 24/10* (2013.01); *H04W 74/0833* (2013.01); *H04W 74/0838* (2024.01)

(58) Field of Classification Search

CPC .. H04W 24/10; H04W 74/0833; H04W 76/20
See application file for complete search history.

(56) References Cited

U.S. PATENT DOCUMENTS

| | | | | |
|---|---|---|---|---|
| 11,284,305 | B1 * | 3/2022 | Parihar | H04W 48/16 |
| 2018/0124612 | A1 * | 5/2018 | Babaei | H04W 16/14 |
| 2019/0037604 | A1 | 1/2019 | Akkarakaran et al. | |
| 2019/0104554 | A1 | 4/2019 | Amuru et al. | |
| 2019/0207705 | A1 | 7/2019 | Zhou et al. | |

(Continued)

FOREIGN PATENT DOCUMENTS

| | | |
|---|---|---|
| CN | 106538034 | 3/2017 |
| CN | 11182584 | 5/2020 |

(Continued)

OTHER PUBLICATIONS

First Extended Report for IN Application No. 202247049584, Mail Date Feb. 2, 2024. 8 pages.

(Continued)

*Primary Examiner* — Brian P Cox
(74) *Attorney, Agent, or Firm* — Perkins Coie LLP

(57) ABSTRACT

The present document relates to methods, systems, and devices related to digital wireless communication, and more specifically, to techniques related to wireless cell activation and deactivation. In one exemplary aspect, a method for data communication is disclosed. The method includes receiving, by a terminal, a first message from a network node, the first message including information for a first action to be performed relating to a secondary group of cells. The method also includes performing, by the terminal, the first action relating to the secondary group of cells in a deactivated state responsive to the receiving of the first message from the network node.

18 Claims, 5 Drawing Sheets

(56) References Cited

U.S. PATENT DOCUMENTS

| | | | | |
|---|---|---|---|---|
| 2020/0359247 | A1* | 11/2020 | Yi | H04W 80/02 |
| 2021/0352750 | A1* | 11/2021 | Cheng | H04W 76/27 |
| 2022/0279435 | A1* | 9/2022 | Cheng | H04W 36/0069 |
| 2023/0128847 | A1* | 4/2023 | Purkayastha | H04W 56/0045<br>370/329 |
| 2024/0032135 | A1* | 1/2024 | Cheng | H04W 76/27 |

FOREIGN PATENT DOCUMENTS

| | | |
|---|---|---|
| CN | 111264042 | 6/2020 |
| WO | 2020/113442 | 6/2020 |
| WO | 2020/144919 | 7/2020 |

OTHER PUBLICATIONS

Extended European Search Report for EP Application No. 20948175.3, Mail Date Aug. 7, 2023. 10 pages.

CATT "SCG Dormant state" 3GPP TSG-RAN WG2 Meeting #106 Reno, USA, May 13-17, 2019, R2-1905881 Resubmission R2-1903318, 4 pages.

ZTE, "Activation/Deactivation for SCell carrying PUCCH," 3GPP TSG RAN WG2 #89, Athens, Greece, R2-150150, 4 pages, Feb. 9-13, 2015.

ISA, International Search Report and Written Opinion for International Application No. PCT/CN2020/106537, Mail Date Apr. 27, 2021. 9 pages.

Office Action for Chinese Application No. 202080102079.2, Mail Date Apr. 18, 2025. 17 pages with unofficial English translation.

Huawei, et al. "Stage 2 for secondary RAT data volume reporting" 3GPP TSG RAN WG3 Meeting #98 R3-174575, Reno, Nevada, US, Nov. 27-Dec. 1, 2017, 20 pages.

Ericsson "On RRM requirements with dual connectivity between LTE and NR" 3GPP TSG RAN WG4 Meeting #82bis R4-1703201, Spokane, Washington, USA, Apr. 3-7, 2017, 3 pages.

CATT "Direct CA or DC Activation and Deactivation" 3GPP TSG-RAN WG2 Meeting #106 R2-1905880, Reno, USA, May 13-17, 2019 Resubmission of R2-1903315, 2 pages.

CNIPA, Notice of Grant for Chinese Application No. 202080102079.2, mailed on Sep. 10, 2025, 4 pages with unofficial English translation.

Office Action for co-pending KR Application No. 10-2022-7032580, dated Mar. 6, 2026, 10 pages with Google translation.

Hearing Noice for co-pending IN Application No. 202247049584, dated Apr. 10, 2026, 3 pages.

3rd Generation Partnership Project; Technical Specification Group Radio Access Network; Evolved Universal Terrestrial Radio Access (E-UTRA) and NR; Multi-connectivity; Stage 2 (Release 16); 79 pages.

* cited by examiner

100

UE 102

NW 104

FIRST MESSAGE (INCLUDING
INFORMATION RELATING TO AN ACTION
TO BE PERFORMED RELATING TO A SCG)
106

PERFORM FIRST
ACTION RELATING TO
SCG 108

300

RECEIVE A FIRST MESSAGE FROM A NETWORK NODE, THE FIRST MESSAGE INCLUDING INFORMATION FOR A FIRST ACTION TO BE PERFORMED RELATING TO A SECONDARY GROUP OF CELLS �circ 302

PERFORM THE FIRST ACTION RELATING TO THE SECONDARY GROUP OF CELLS IN A DEACTIVATED STATE RESPONSIVE TO THE RECEIVING OF THE FIRST MESSAGE FROM THE NETWORK NODE �circ 304

WIRELESS CELL ACTIVATION AND DEACTIVATION

CROSS-REFERENCE TO RELATED APPLICATION

This application is a continuation and claims priority to International Application No. PCT/CN2020/106537, filed on Aug. 3, 2020, the disclosure of which is hereby incorporated by reference herein in its entirety.

TECHNICAL FIELD

This patent document is directed generally to wireless communications.

BACKGROUND

Mobile communication technologies are moving the world toward an increasingly connected and networked society. The rapid growth of mobile communications and advances in technology have led to greater demand for capacity and connectivity. Other aspects, such as energy consumption, device cost, spectral efficiency, and latency are also important to meeting the needs of various communication scenarios. Various techniques, including new ways to provide higher quality of service, are being discussed.

SUMMARY

This document discloses methods, systems, and devices related to digital wireless communication, and more specifically, to techniques related to wireless cell activation and deactivation.

In one exemplary aspect, a method for data communication is disclosed. The method includes receiving, by a terminal, a first message from a network node, the first message including information for a first action to be performed relating to a secondary group of cells. The method also includes performing, by the terminal, the first action relating to the secondary group of cells in a deactivated state responsive to the receiving of the first message from the network node.

In another exemplary aspect, a wireless communications apparatus comprising a processor is disclosed. The processor is configured to implement a method described herein.

In yet another exemplary aspect, the various techniques described herein may be embodied as processor-executable code and stored on a computer-readable program medium.

The details of one or more implementations are set forth in the accompanying attachments, the drawings, and the description below.

Other features will be apparent from the description and drawings, and from the clauses.

DETAILED DESCRIPTION

Figure 1:
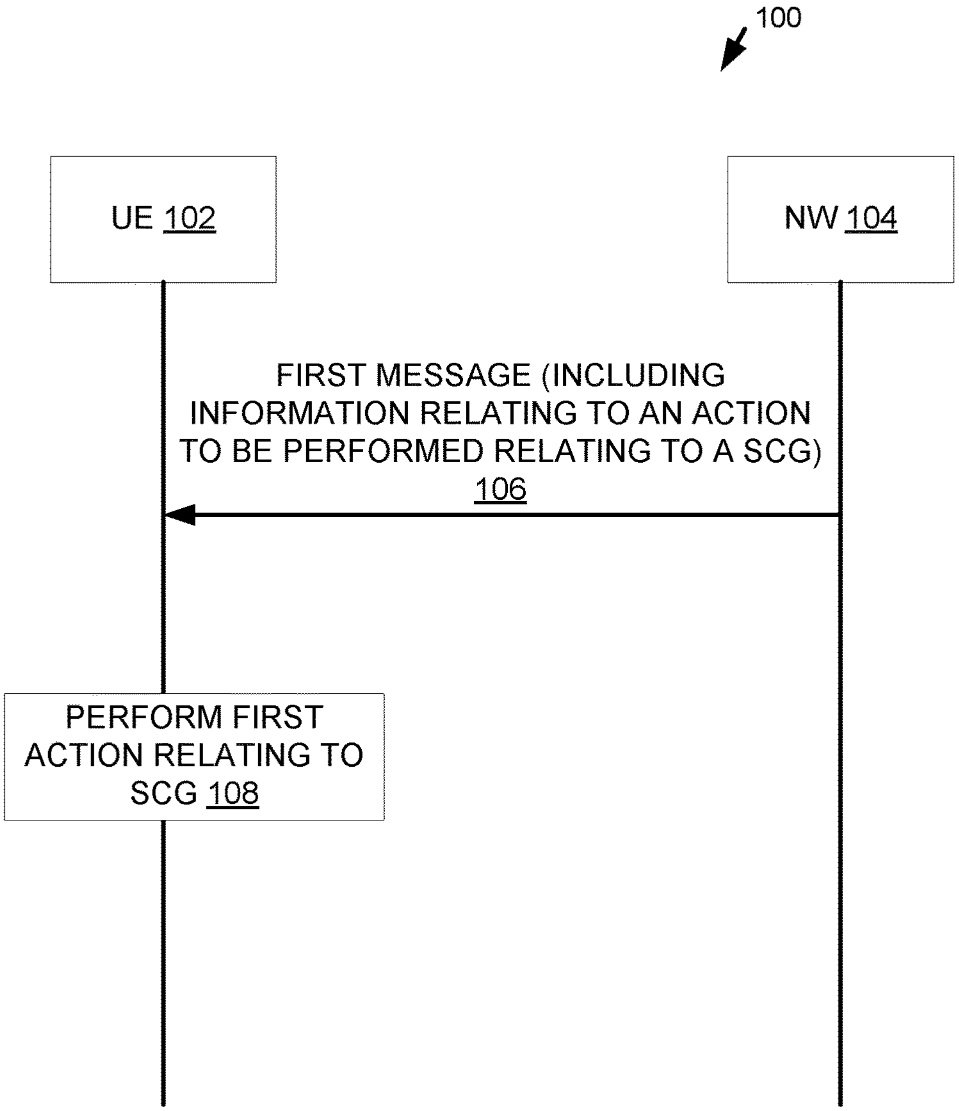
FIG. 1 is a signaling process of an example method for reporting an instruction to perform an action relating to a SCG.

Section headings are used in the present document only to improve readability and do not limit scope of the disclosed embodiments and techniques in each section to only that section. Certain features are described using the example of Fifth Generation (5G) wireless protocol. However, applicability of the disclosed techniques is not limited to only 5G wireless systems.

The development of the new generation of wireless communication—5G New Radio (NR) communication—is a part of a continuous mobile broadband evolution process to meet the requirements of increasing network demand. NR will provide greater throughput to allow more users connected at the same time. Other aspects, such as energy consumption, device cost, spectral efficiency, and latency are also important to meeting the needs of various communication scenarios.

In cellular mobile communication systems, in order to support higher data throughput, a UE can be configured with more than one radio links for data transmission. In 5G NR (New Radio) systems, except CA (Carrier Aggregation) operation, a UE can be configured with dual connectivity (DC) and connected to two radio access nodes. The radio access node that provides the control plan connection to the core network may be called Master Node (MN), a group of serving cells associated with the Master Node may be called Master Cell Group (MCG), comprising of PCell and optionally one or more SCells. The radio access node that provides additional connection may be called Secondary Node (SN), a group of serving cells associated with Secondary Node may be called Secondary Cell Group (SCG), comprising of PSCell and optionally one or more SCells. The MN and SN can belong to the same RAT (Radio Access Technology) or different RATs. For instance, in EN-DC, a UE is connected to one eNB that acts as a MN and one en-gNB that acts as a SN. In NR-DC, a UE is connected to one gNB that acts as a MN and another gNB that acts as a SN.

However, with the application of dual connectivity, the UE and network power consumption may incur issues, because the UE may need to connect with two nodes simultaneously. Moreover, the power consumption when communicating with NR node is much higher than communication with LTE node. Therefore, it may be desired to minimize the power consumption as much as possible.

One potential solution is to release the SN connection when UE's power consumption is high or the data rate is low. However, the disadvantage is that, when UE's power consumption decreases and larger data transmission is required, the network may have to re-add the SN as soon as possible. But due to network has to acquire UE's measurement results to identify the qualified SCG cells first, the latency of SN addition procedure may be large as a consequence.

To balance power consumption and efficient state transition, another alternative solution is to suspend/deactivate the SCG cells in this case, and resume/activate the SCG cells when situation relieve. In this disclosure, methods are provided for this approach.

In 5G system, for CA operation, in order to reduce UE's power consumption, a mechanism called "SCell dormancy"

may be introduced. More specifically, the SCell can be configured with more than one Bandwidth Parts (BWPs), and one downlink BWP is configured as dormant BWP, when UE is switched to this dormant BWP, the UE may not be required to monitor PDCCH, all uplink and downlink data transmission are stopped, thus the UE's battery life can be saved. In case the network wants to change the SCell from dormant state to non-dormant State, the network can trigger BWP switching in the SCell. This can be done by sending RRC signaling or transmitting DCI to UE via the corresponding primary cell (PCell or PSCell).

However, the above solution may only apply to SCell. For PCell and PSCell, the cell may be in an activation state until the cell is released, thus the UE power consumption on PCell/PSCell may remain unchanged in current specifications.

System Overview

The present embodiments relate to SCG suspension (e.g., SCG deactivation or SCG dormancy) and SCG resume (e.g., SCG activation). A suspended SCG (e.g., or deactivated SCG) may mean the PSCell is in deactivated state or dormant state, and the SCell may be in a deactivated state or dormant state. In addition, SCG resume may mean the PSCell is transmitted from deactivated state to activated state, or the PSCell is transmitted from deactivated state to dormant state, or the PSCell is transmitted from dormant state to non-dormant state. SCG resume may also mean one or more SCells is transmitted from deactivated state to activated state, or the one or more SCells is transmitted from deactivated state to dormant state, or the one or more SCells is transmitted from dormant state to non-dormant state.

In some embodiments, the MN can be an eNB, a ng-eNB, or a gNB, and the SN can be a eNB, a ng-eNB, or a gNB. In this document, the "RAN node" may also be named as "network," it can be an eNB, a ng-eNB, or a gNB.

The network can first send a first message (RRC or MAC CE or DCI) to UE. The first message can indicate any of: whether the UE is allowed to trigger SCG resume (e.g. or activation) by performing RACH procedure on PSCell, a threshold of data buffer size, for UE to determine whether the UE needs to trigger SCG resume procedure, a validity timer together with dedicated RACH resources on PSCell, whether the UE should maintain the configured SCG PUCCH resource, scheduling request (SR) resource after SCG time alignment timer (TAT) expires, whether the UE should perform radio link monitoring (RLM) on PSCell when SCG is in deactivated state, whether the UE should perform RRM measurement on SCG serving cell when SCG is in deactivated state, which SN configured RRM measurement(s) should be performed (or suspended) when SCG is in deactivated state, and/or a field indicating whether the UE should inform network when the quality of PSCell is lower than a threshold.

In some embodiments, upon reception of the first message, the UE deactivates the SCG.

In some embodiments, within the first message, the above information may be provided by only MN, or only SN, or partial by MN partial by SN.

In some embodiments, the first message can be sent by MN or SN. In case the first message is sent from MN to UE, the message may include another message generated by SN. In case the first message is sent from SN to UE, the message may be transmitted to UE via MN on SRB1, or the message may be transmitted to UE directly on SRB3.

FIG. 1 is a signaling process 100 of an example method for reporting an instruction to perform an action relating to a SCG. In step 106, the network node (NW) 104 can send a first message to the UE 102. The first message can include information relating to an action to be performed relating to a SCG. In step 108, the UE 102 can perform a first action relating to the SCG. The first action can relate to an SCG activation/deactivation procedure as described herein.

Information Type 1

A first type of information can include information indicating whether the UE is allowed to trigger SCG resume by performing RACH procedure on PSCell. The information can be expressed in explicit way or implicit way.

In some embodiments, the explicit way can indicate an explicit field included in the first message;

In some embodiments, the implicit way can indicate the reception of the first message itself, or based on the presence of other configuration (e.g. SRB3, or dedicated RACH resources on PSCell).

In some embodiments, if the UE does not receive the information, or the received information indicates the UE cannot trigger SCG resume by performing RACH procedure on PSCell, the UE may send SCG resume request message to PCell when the UE wants to resume SCG.

In a first example, an EN-DC UE encounters overheating problem, and sends UE Assistant information message to network because the UE wants to reduce its serving cells. Upon receiving the message, the MN can decide to trigger SCG deactivation, then the MN first sends a message (e.g. SgNB modification request) to SN, inform SN to suspend SCG. After receiving the response message (e.g. SgNB modification request ack) from SN, the MN can send an RRC message to UE to inform UE to deactivate the SCG. Meanwhile, this RRC message may include a field set to "False," indicating that the UE may not be allowed to perform SCG resume by triggering RACH procedure towards PSCell during SCG activation state.

Upon reception this message, the UE can deactivate the SCG and stops DL/UL data transmission. Later on, when UE has UL data arrives, and UE's overheating problem relieves, UE can determine to trigger SCG resume procedure. However, based on the received indication, UE cannot trigger RACH procedure towards PSCell directly, thus the UE sends a SCG resume request message to MN, asks MN to resume the SCG connection.

A second example can include an EN-DC UE encountering an overheating problem and sending UE assistant information message to network because the UE wants to reduce its serving cells. Upon receiving the message, the MN can decide to trigger SCG deactivation, then the MN first sends a message (e.g. SgNB modification request) to SN, inform SN to suspend SCG. Then the SN can send the response message (e.g. SgNB modification request ack) to MN. Within the response message, the SN can also include a field set to "False," because the SN can decide to disallow the UE to perform SCG resume by triggering RACH procedure towards PSCell.

After receiving the response message from SN, the MN can send an RRC message to UE, this RRC message can include the field that indicating the UE is not allowed to perform SCG resume by triggering RACH procedure towards PSCell. And the field may be contained in a container which is transparent to MN node.

Upon reception this message, the UE can deactivate the SCG and stops DL/UL data transmission. Later on, when there is UL data arrives, and UE's overheating problem relieves, the UE can determine to trigger SCG resume procedure. However, based on the received indication, the UE may know that it cannot trigger RACH procedure towards PSCell directly, and the UE can send a SCG resume request message to MN, asks MN to resume the SCG connection.

A third example can include a NR-DC UE encountering an overheating problem and sending UE assistant information message to network because the UE wants to reduce its serving cells. Upon receiving the message, the MN can decide to trigger SCG deactivation, then the MN can first send a message (e.g. SN modification request) to SN, inform SN to suspend SCG. Then the SN can send the response message (e.g. SN modification request ack) to MN. Within the response message, the SN can also include the dedicated RACH resources, because the SN decides to allow the UE to perform SCG resume by triggering RACH procedure towards PSCell.

After receiving the response message from SN, the MN can send a RRC message to UE, this RRC message can include the SN configured dedicated RACH resources that can be used to perform SCG resume by triggering RACH procedure towards PSCell. And the dedicated RACH configuration may be contained in a container which is transparent to MN node.

Upon reception this message, the UE can deactivate the SCG and stops DL/UL data transmission. Later on, when there is UL data arrives, and UE's overheating problem relieves, the UE determines to trigger SCG resume procedure. And based on the received dedicated RACH resources, the UE can directly trigger RACH procedure towards PSCell, to inform SN to resume SCG.

Information Type 2

A second information type can include information of data buffer size threshold, if provided, the UE may trigger SCG resume only if UE's uplink data buffer size of a radio bearer (or DRB) is higher than the threshold.

In some embodiments, the threshold may be provided as per-UE level, or per-DRB level.

In some embodiments, the threshold only applies to split bearer, including MN terminated split bearer and SN terminated split bearer.

In some embodiments, for split bearer, upon SCG deactivation, the UE may autonomously switch the primary path of the bearer to MCG leg.

In a first example, for an EN-DC UE, the MN can decide to deactivate the SCG, and the MN sends a RRC message to UE, the message is used to inform UE to perform SCG deactivation (or suspension). Within the RRC message, the MN can include a UL data buffer size threshold, and the threshold applies to configured split bearers.

After receiving the RRC message, the UE can deactivate the SCG and stop UL/DL data transmission. In addition, the UE can autonomously switch the primary path of the split bearers to refer to MCG leg. Later on, there is UL data arrives on a split bearer (DRB). The UE can compare the UL data buffer size of the DRB with configured threshold, in case the UL buffer size of a split bearer is smaller than the configured threshold, the UE transmits the UL data via MCG leg of the split bearer and remains SCG in deactivated state. In case the UL buffer size of a split bearer is larger than the configured threshold, the UE can trigger SCG resume procedure. This can be done by sending SCG resume request message to MN, or by triggering RACH procedure towards PSCell.

In a second example with a EN-DC UE, the UE is configured with a MN terminated split bearer (DRB1) and a SN terminated split bearer (DRB2), the MN can decide to deactivate the SCG, the MN first sends a message (e.g. SgNB modification request) to SN, inform SN to suspend the SCG. Then the SN can send the response message (e.g. SgNB modification request ack) to MN. Within the response message, the SN can include a UL data buffer size threshold field (e.g. threshold2), and it applies to the SN terminated split bearer (i.e. the radio bearer configured by radioBearerConfig2 parameter. E.g. DRB2).

After receiving the response message from SN, the MN can send an RRC message to UE, includes the SN configured UL data buffer size threshold field. And the SN configured UL data buffer size threshold field may be contained in a container which is transparent to MN node. In addition, the MN can also include a UL data buffer size threshold field (e.g. threshold1) in this RRC message, and it can apply to the MN terminated split bearer (i.e. the radio bearer configured by radioBearerConfig parameter. E.g. DRB1).

After receiving the RRC message, the UE can deactivate the SCG and stop UL/DL data transmission. In addition, the UE can autonomously switch the primary path of all split bearers (DRB1 and DRB2) to refer to MCG leg.

UL data can arrive on split bearer (DRB1). The UE can compare the UL data buffer size of the DRB1 with configured threshold (e.g. threshold1), in case the UL buffer size of DRB1 is smaller than the configured threshold1, the UE transmits the UL data via MCG leg of the split bearer and remains SCG in deactivated state. In case the UL buffer size of DRB1 is larger than the configured threshold1, the UE can trigger SCG resume procedure.

In some cases, UL data can arrive on split bearer (DRB2). The UE can compare the UL data buffer size of the DRB2 with configured threshold (e.g. threshold2), in case the UL buffer size of DRB2 is smaller than the configured threshold2, the UE transmits the UL data via MCG leg of the split bearer and remains SCG in deactivated state. In case the UL buffer size of DRB2 is larger than the configured threshold2, the UE can trigger SCG resume procedure.

Information Type 3

A third information type can include information of the validity timer together with dedicated RACH resource on PSCell. If provided, the UE can start the timer when SCG is deactivated, and the timer length is equal to the received timer value. Before the timer expires, if the UE wants to trigger SCG resume, the UE can trigger contention-free random access towards PSCell based on the configured dedicated RACH resource.

In some embodiments, UE may release the configured dedicated RACH resources when timer expires;

In some embodiments, UE may trigger contention-based random access towards PSCell after timer expires; or after contention-free random-access procedure fails on PSCell.

In some embodiments, the validity timer can be provided as per UE level, or per RACH resource level.

In a first example, for an EN-DC UE, the MN decides to trigger SCG deactivation, and MN first sends a message (e.g. SgNB modification request) to SN, inform SN to suspend SCG. Then, the SN can send the response message (e.g. SgNB modification request ack) to MN. Within the response message, the SN can also include the dedicated RACH resources together with a validity timer value.

After receiving the response message from SN, the MN can send an RRC message to UE, this RRC message can also include the SN configured dedicated RACH resources and the validity timer value. The dedicated RACH configuration and validity timer value may be contained in a container which is transparent to MN node.

Upon reception this RRC message, the UE can deactivate the SCG and stops DL/UL data transmission. In addition, the UE can start a timer with timer length equals to the received timer value. Later on, when UL data arrives, the UE can determine to trigger SCG resume procedure. If the timer is still on-going, then based on the received dedicated RACH resources, the UE can directly trigger contention-free RACH procedure towards PSCell, to inform SN to resume SCG. If the timer already expires, the UE can trigger contention-based RACH procedure towards PSCell, to inform SN to resume SCG; or the UE can trigger SCG resume request message to MN node, ask MN to resume SCG. In addition, the UE can release the configured dedicated RACH resources when the timer expires.

Information Type 4

A fourth information type can include information indicating whether the UE should maintain the configured SCG PUCCH resource and SR resource after SCG TAT expires. The information can be expressed in explicit way or implicit way.

In some embodiments, the explicit way means explicit field included in the first message. For example, a field set to "True" means when SCG is deactivated, the UE should maintain the configured SCG PUCCH and SR resources upon SCG TAT expires; a field set to "False" means when SCG is deactivated, the UE should release the configured SCG PUCCH and SR resources upon SCG TAT expires.

In some embodiments, the implicit way means by pre-defined rules in specification. For example, the specification defines when SCG is deactivated, the UE should maintain the configured SCG PUCCH and SR resources upon SCG TAT expires; or the specification defines when SCG is deactivated, the UE should release the configured SCG PUCCH and SR resources upon SCG TAT expires.

In some embodiments, if UE is indicated to release the configured SCG PUCCH and SR resources after SCG TAT expires, the UE may use pre-defined default PUCCH and SR configuration when triggering SCG resume.

In a first example, for an EN-DC UE, the MN decides to trigger SCG deactivation, and MN first sends a message (e.g. SgNB modification request) to SN, inform SN to suspend SCG. Then, the SN can send the response message (e.g. SgNB modification request ack) to MN. Within the response message, the SN can also include a field (e.g. 1 bit set to "True") indicates the UE should maintain the configured SCG PUCCH and SR resources upon SCG TAT expires.

After receiving the response message from SN, the MN can send an RRC message to UE, this RRC message also includes the SN configured field which indicates UE to maintain the SCG PUCCH and SR resources upon SCG TAT expires. This field may be contained in a container which is transparent to MN node.

Upon reception of the RRC message, the UE can deactivate the SCG and stops DL/UL data transmission. When SCG TAT expires, the UE can maintain the SCG PUCCH and SR resources based on network configuration.

Later on, when UE determines to trigger SCG resume procedure, and UE decides to trigger RACH procedure towards PSCell, since PUCCH and SR resources are maintained, the UE can directly use the resources if needed.

Information Type 5

A fifth information type can include information indicating whether the UE should perform RLM on PSCell when SCG is deactivated. The information can be expressed in explicit way or implicit way.

In some embodiments, the explicit way means explicit field included in the first message. For example, a field set to "True" means the UE should perform RLM on PSCell when SCG is deactivated; a field set to "False" means the UE should stop RLM on PSCell when SCG is deactivated.

In some embodiments, the implicit way may mean the presence of RLM resource configuration in the first message. For instance, the UE performs RLM on PSCell if the RLM resource of PSCell is provided in the first message; the UE stops RLM on PSCell if the RLM resource of PSCell is not provided or released in the first message.

In some embodiments, the implicit way may mean by pre-defined rules in specification. For example, the specification defines UE should perform RLM on PSCell when SCG is deactivated; or the specification defines UE should stop RLM on PSCell when SCG is deactivated.

In some embodiments, if UE is indicated to perform RLM on PSCell, without configured RLM reference signal resources, the UE may perform PSCell RLM based on all transmitted SSB indexes in PSCell.

In some embodiments, the network may provide new RLM related parameters to UE. E.g T310, N310, N311. And these parameters are used when UE performs RLM during SCG deactivation state.

In some embodiments, when SCG is deactivated, and UE evaluates that RLF happens on PSCell, the UE sends SCG failure report to MN. The SCG failure report may also include measurement results of SCG serving cells and other neighbor cells.

As a first example, for an EN-DC UE, the MN can decide to trigger SCG deactivation, and MN first sends a message (e.g. SgNB modification request) to SN, inform SN to suspend SCG. The SN can then send the response message (e.g. SgNB modification request ack) to MN. Within the response message, the SN can include a field (e.g. 1 bit set to "True") indicating that the UE should perform RLM on PSCell when SCG is deactivated, and SN may also provide new RLM related parameters (e.g. T310, N310, N311) in the response message.

After receiving the response message from SN, the MN can send an RRC message to UE, this RRC message can also include the SN configured fields which indicates UE to perform RLM on PSCell when SCG is deactivated and relevant RLM parameters (e.g. T310, N310, N311). The fields may be contained in a container which is transparent to MN node.

Upon reception of the RRC message, the UE can deactivate the SCG and stops DL/UL data transmission. In addition, based on the RLM configuration, the UE can continue radio link monitoring on PSCell by monitoring all the transmitted SSB in PSCell (i.e. the transmitted SSBs are given by ssb-PositionsInBurst and ssb-periodicityServingCell parameters).

When T310 timer expires, the UE can declare RLF on PSCell, then the UE can send SCGFailureInformation report to MN. In addition, the UE may also include measurement results of SCG serving cell and neighbor cells in SCGFailureInformation report. After receiving the report, MN may decide to release the SCG, or the MN may decide to change PSCell/SN based on the received measurement results, or the MN may forward the content of SCGFailureInformation to SN and let SN to decide whether to change or release SN.

Information Type 6

A sixth information type can include information indicating whether the UE should perform RRM measurement on SCG serving cell (e.g. PCell and/or SCG SCells) when SCG is in deactivated state. The information can be expressed in explicit way or implicit way.

In some embodiments, the explicit way means explicit field included in the first message. For example, a field set to “True” means the UE should perform RRM measurement on SCG serving cells (e.g. PSCell and/or SCG SCells) when SCG is deactivated; a field set to “False” means the UE should stop RRM measurement SCG serving cells (e.g. PSCell and SCG SCells) when SCG is deactivated.

In some embodiments, the explicit field may also be provided as per serving cell level. For example, the field can be a bit string, each bit corresponds to one serving cell in SCG.

In some embodiments, the implicit way may mean by pre-defined rules in specification. For example, the specification defines UE should perform RRM measurement on PSCell (or SCG SCells) when SCG is deactivated; or the specification defines UE should stop RRM measurement on PSCell (or SCG SCells) when SCG is deactivated.

In some embodiments, the RRM measurement on serving cell can be performed based on SSB resources and/or CSI-RS resources.

In some embodiments, the RRM measurement on SCG serving cell is performed irrespective of configured s-Measure value.

In some embodiments, the measurement quantity can be one or more of followings: SSB-RSRP, SSB-RSRQ, SSB-SINR, CSI-RS-RSRP, CSI-RS-RSRQ; CSI-RS-SINR.

Information Type 7

A seventh information type can include information of indicating which SN configured RRM measurement(s) should be performed (or suspended) by UE when SCG is deactivated. The information can be expressed in explicit way or implicit way.

In some embodiments, the explicit way means explicit field included in the first message. The type of the field can be one of the following:

A bit string, each bit corresponds to a measurement identity (measID) configured by SN. The bit value equals to “0” means the UE should perform the corresponding measurement, and the bit equals to “1” means the UE should suspend the corresponding measurement.

A list of measurement identities (measID). If a measID is included in the list, it means the UE should perform the measurement of that measID. Or it means the UE should suspend/stop the measurement of that measID, A field included in reportConfig, indicates whether this reportConfig associated measID should be performed (or suspended).

In some embodiments, the implicit way may mean by pre-defined rules in specification. For example, the specification defines the UE suspends all periodical reporting measurement when SCG is deactivated. Or the specification defines the UE suspends all non-serving frequency based measurements.

In some embodiments, “suspend a measurement” means the UE stops the measurement performing, evaluation and reporting. Optionally, the UE may resume the measurement execution after the SCG is activated.

In a first example, for a NR-DC UE, both MN and SN have configured RRM measurements to UE, and SN can configure any of the following measurements:

measID=1, A2 event on Freq1 (frequency of PSCell)

measID=2, A3 event on Freq1 (frequency of PSCell);

measID=3, A6 event on Freq2 (frequency of a SCG SCell);

measID=4, A4 event on Freq3 (non-serving frequency).

measID=1 can be meant to monitor the quality of PSCell; measID=2 can be meant to trigger intra-frequency PSCell change; measID=3 can be meant to trigger SCell change; measID=4 can be meant to trigger inter-frequency PSCell change.

When MN decides to trigger SCG deactivation, MN can first send a message (e.g. SN modification request) to SN, inform SN to suspend SCG. After receiving this message, in order to update UE’s PSCell timely, the SN can decide to maintain measID=1&2, and suspend measID=3&4 when SCG is deactivated. The SN can send the response message (e.g. SN modification request ack) to MN. Within the response message, the SN can include a bit map, the length of bit map is 32 (equals to the maximum number of measIDs that can be configured by SN). And sets “bit 0” (corresponds to measID=1) and “bit 1” (corresponds to measID=2) to “1,” all other bits are set to “0.”

After receiving the response message from SN, the MN can send an RRC message to UE, this RRC message can also include the SN configured measurement bitmap field. And the field may be contained in a container which is transparent to MN node.

Upon reception of the RRC message, the UE can deactivate the SCG and stops DL/UL data transmission. In addition, based on the received bitmap the UE stops measurement, evaluation and reporting of measID=3 and measID=4, and continues measurements on measID=1 and measID=2. In addition, if SRB3 was configured, upon SCG deactivation, the UE can suspend the SRB3 transmission, and sends SN configured measurement report to network (SN) via SRB1.

When UE evaluates measID=2 is fulfilled (e.g. a neighbor cell2 is higher than PCell), the UE can send a measurement report (MR) to network, the MR is contained in MN RRC message, and MN forwards the MR to SN side. After receiving the MR, the SN can trigger PSCell change and SN change procedure to move UE context to target cell2.

In this case, the UE may keep SCG in deactivated state, thus no RACH procedure is triggered immediately. Later on, when network or UE can trigger SCG resume procedure, the UE can trigger RACH procedure towards PSCell.

When UE evaluates the measID=1 is satisfied, the UE can send the measurement report (MR) to network, the MR is contained in an MN RRC message, and MN forwards the MR to SN side. Upon receiving the MR, the SN may trigger SN release procedure, and release the suspended SCG.

During SCG resume procedure, the UE autonomously resume all SN configured measurements (measID=1&2&3&4).

In a second example, for a NR-DC UE, both MN and SN have configured RRM measurements to UE, and SN can configure any of the following measurements:

measID=1, A2 event on Freq1 (frequency of PSCell)

measID=2, A3 event on Freq1 (frequency of PSCell);

measID=3, A6 event on Freq2 (frequency of a SCG SCell);

measID=4, A4 event on Freq3 (non-serving frequency).

measID=1 can be meant to monitor the quality of PSCell; measID=2 can be meant to trigger intra-frequency PSCell change; measID=3 can be meant to trigger SCell change; measID=4 can be meant to trigger inter-frequency PSCell change.

When MN decides to trigger SCG deactivation, MN can first send a message (e.g. SN modification request) to SN, inform SN to suspend SCG. After receiving this message, in order to update UE's PSCell timely, the SN can decide to maintain measID=1&2, and suspend measID=3&4 when SCG is deactivated. The SN can send the response message (e.g. SN modification request ack) to MN. Within the response message, the SN can include a list field, the first entry can be set to 1 (corresponds to measID=1), and the secondary entry can be set to 2 (corresponds to measID=2).

After receiving the response message from SN, the MN can send an RRC message to UE, this RRC message can also include the SN configured measID list field. And the field may be contained in a container which is transparent to MN node.

Upon reception of the RRC message, the UE can deactivate the SCG and stop DL/UL data transmission. In addition, based on the received bitmap the UE stops measurement, evaluation and reporting of measID=3 and measID=4, and continues measurements on measID=1 and measID=2. In addition, if SRB3 was configured, upon SCG deactivation, the UE can suspend the SRB3 transmission and send SN configured measurement report to network (SN) via SRB1.

In a third example, for a NR-DC UE, both MN and SN have configured RRM measurements to UE, and SN can configure the following measurements:

measID=1, reportConfig ID1, A2 event on Freq1 (frequency of PSCell)

measID=2, reportConfig ID2, A3 event on Freq1 (frequency of PSCell);

measID=3, reportConfig ID3, A6 event on Freq2 (frequency of a SCG SCell);

measID=4, reportConfig ID4, A4 event on Freq3 (non-serving frequency).

measID=1 can be meant to monitor the quality of PSCell; measID=2 can be meant to trigger intra-frequency PSCell change; measID=3 can be meant to trigger SCell change; measID=4 can be meant to trigger inter-frequency PSCell change.

During normal measurement configuration procedure, the SN can include a field in reportConfig (with ID1&2) configuration separately, and set the field to "True," which can imply the associated measID=1&2 should be performed when UE's SCG is deactivated.

Later on, when network triggers SCG deactivation procedure, upon reception of the SCG deactivation message, the UE can deactivate the SCG and stops DL/UL data transmission. In addition, the UE can stop measurement, evaluation and reporting of measID=3 and measID=4, and continues measurements on measID=1 and measID=2. In addition, if SRB3 was configured, upon SCG deactivation, the UE can suspend the SRB3 transmission and send SN configured measurement report to network (SN) via SRB1.

Information Type 8

An eighth information type can include information indicating whether the UE should inform network (MN or SN) when the measurement result of PSCell is lower than threshold. The information can be expressed in explicit way or implicit way.

In some embodiments, the explicit way means explicit field included in the first message. For example, a field set to "True" means the UE should inform network when the measurement result of PSCell is lower than threshold when SCG is deactivated; a field set to "False" means the UE is not required to inform network immediately when the measurement result of PSCell is lower than threshold when SCG is deactivated.

In some embodiments, the implicit way may mean by pre-defined rules in specification. For example, the specification defines the UE should inform network when the measurement result of PSCell is lower than threshold, or vice versa.

In some embodiments, the implicit way may mean by the presence of threshold configuration. For example, in case the network provides the threshold parameter for PSCell judgment, it implies the UE should inform network immediately when the PSCell measurement result is lower than the threshold; In case the network does not provide the threshold parameter for PSCell judgment, it implies the UE is not required to inform network immediately when the PSCell measurement is bad.

In some embodiments, in case the UE is not required the inform network immediately when the quality of PSCell is lower than threshold, during network triggered SCG resume procedure, or during UE triggered SCG resume procedure, UE may inform network the quality of the PSCell does not fulfill the threshold, or the UE can reject the resume request by including corresponding cause value (e.g. bad PSCell quality).

In some embodiments, when UE sends response information to network, the information may be included in a RRC message, and the UE may also include the measurement result of serving cell, and/or the measurement results of one or more neighbor cells in the same message.

In some embodiments, after receiving the information from UE, the network may trigger SN release, SN change or PSCell change procedure.

In some embodiments, the type of measurement results can be one or more of followings: SSB-RSRP, SSB-RSRQ, SSB-SINR, CSI-RS-RSRP, CSI-RS-RSRQ; CSI-RS-SINR.

In a first example, for an EN-DC UE, the MN can decide to trigger SCG deactivation, and MN first sends a message (e.g. SgNB modification request) to SN, inform SN to suspend SCG. After receiving the response message (e.g. SgNB modification request ack) from SN, the MN can send an RRC message to UE. Within the message, the MN includes a RSRP threshold field, indicating the UE should inform MN when PSCell's RSRP is lower than the threshold.

Upon reception of the RRC message, the UE can deactivate the SCG and stop DL/UL data transmission. During SCG deactivation state, the UE can continue PSCell measurement, and evaluate whether the PSCell's RSRP is lower than the threshold.

When PSCell RSRP is lower than the threshold, the UE can send a message to MN, within the message, the UE indicates the PSCell is bad, meanwhile, the UE may also include measurement results of PSCell and other neighbor cells. Upon receiving the message from UE, MN decides whether to release the suspended SCG, or trigger SN/PSCell change.

In a second example, for an EN-DC UE, the MN decides to trigger SCG deactivation, and MN first sends a message (e.g. SgNB modification request) to SN, inform SN to suspend SCG. After receiving the response message (e.g. SgNB modification request ack) from SN, the MN can send an RRC message to UE. Within the message, the MN can include a RSRP threshold field, and also indicating the UE is not required to inform MN when PSCell's RSRP is lower than the threshold.

Upon reception of the RRC message, the UE can deactivate the SCG and stops DL/UL data transmission. During SCG deactivation state, although UE continues PSCell measurement, the UE may not be required to evaluate whether the PSCell's RSRP is lower than the threshold.

When UE moves outside the coverage of PSCell, the UE may fail to detect the PSCell. In this case, the UE maintains the configured SCG context without informing MN immediately. Later on, when UE receives SCG resume request from network, the UE can evaluate the PSCell quality, and discover the PSCell quality is lower than the configured threshold. In this case, the UE may send response message to MN by indicating the PSCell quality is bad. Or the UE may reject the SCG resume procedure by sending SCG resume reject message to MN.

MN and SN Coordination

Figure 2:
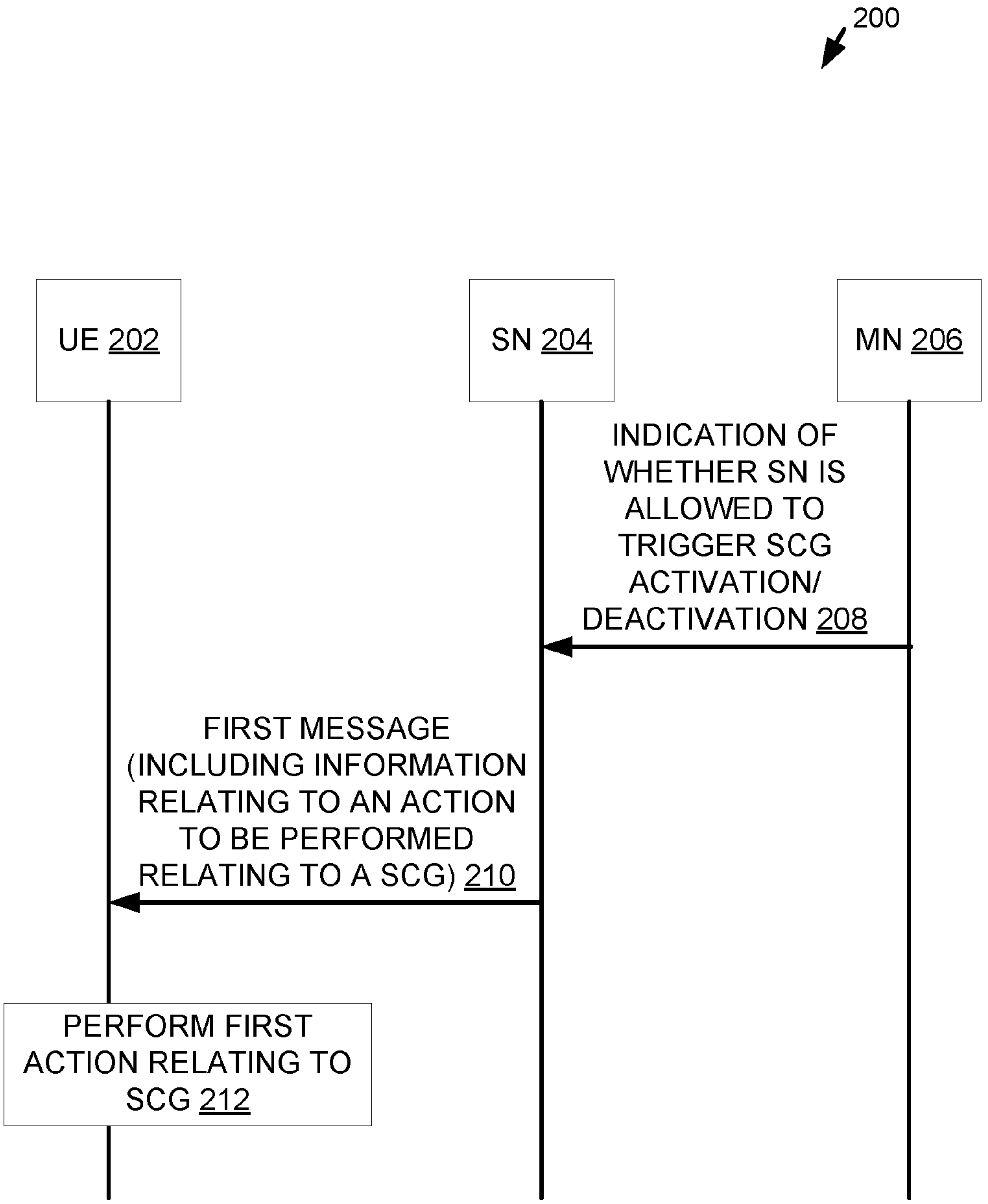
FIG. 2 is a signaling process for an example process for SN and MN coordination in indicating whether an SN is allowed to trigger SCG activation/deactivation.

FIG. 2 is a signaling process 200 for an example process for SN and MN coordination in indicating whether an SN is allowed to trigger SCG activation/deactivation. In step 208, the MN 206 can send an indication of whether the SN is allowed to trigger SCG activation/deactivation to a SN 204. Responsive to the SN being allowed to trigger SCG activation/deactivation, the SN 204 can send a first message 210 to the UE 202 that can include information relating to an action to be performed relating to a SCG. In step 212, the UE 202 can perform a first action relating to the SCG.

The first node can send a message to second node that can include a field indicating whether the second node is allowed to trigger SCG deactivation and activation procedure towards UE.

In some embodiments, the field may be defined as Xn/X2 AP IE, or defined within inter-node RRC message.

In some embodiments, the message may be UE specific message (e.g. SN Addition Request, or SN Modification Request), the message may be cell specific message (e.g. Xn Setup Request, NG-RAN Node Configuration Update). For UE specific message case, the received field applies to the corresponding dual connectivity UE. For cell specific message case, the received field applies to any UE who has configured the second node as SN (or PSCell).

In some embodiments, in case second node receives the field indicates second node is allowed to trigger SCG deactivation and activation procedure towards UE, the second node (acts as SN) can trigger deactivation (or activation) procedure by notifying UE to deactivate (or activate/resume) SCG directly. During this procedure, the second node can inform first node about the SCG state. Or the second node can trigger the procedure which is transparent to first node.

In some embodiments, in case second node receives the field indicates second node is not allowed to trigger SCG deactivation and activation procedure towards UE. If the second node (acts as SN) wants to deactivate (or activate) the SCG, the second node should first send request message to first node, and let first node to inform UE to deactivate (or activate) the SCG.

In some embodiments, when SCG is deactivated, the network (MN or SN) can still trigger SN RRC reconfiguration procedure (e.g. for the purpose of SN change, PSCell change or SCG configuration update). In this case, the network can inform UE to maintain SCG in deactivated state after applying the SN RRC reconfiguration message.

In some embodiments, upon receiving the SN RRC reconfiguration message, the UE may not perform RACH procedure towards PSCell immediately, and UE only triggers RACH on PSCell during SCG activation procedure.

In a first example, for an EN-DC UE, during SN addition procedure, the MN sends a message (e.g. SgNB addition request) to SN. Within the message, the MN can include a X2 AP field, indicates the SN is allowed to trigger SCG deactivation and activation procedure.

Later on, when data transmission on SCG is quite low, or SN receives UE assistant information indicating the UE has overheating problem, the SN can decide to deactivate the SCG. Then SN generates a message (RRC or MAC CE or DCI) and sends to UE. This message can inform UE to deactivate SCG. Upon receiving the message from SN, the UE can deactivate the SCG and stops UL/DL data transmission.

Later on, when SN receives DL data from core network (e.g. on SN terminated SCG bearer), or SN receives DL data from MN (e.g. on MN terminated split bearer), the SN can decide to activate the SCG. SN can generate a message (RRC or MAC CE or DCI) and sends to UE. This message intends to inform UE to activate SCG. Upon receiving the message from SN, the UE activates the SCG and start UL/DL data transmission.

In a second example, for a NR-DC UE, during SN modification procedure, the MN can send a message (e.g. SN modification request) to SN. Within the message, the MN can include a field in inter-node RRC message (e.g. CG-ConfigInfo), indicates the SN is not allowed to trigger SCG deactivation and activation procedure.

Later on, when data transmission on SCG is quite low, or SN receives UE assistant information indicating the UE has overheating problem, the SN can decide to deactivate the SCG. Then SN sends a message (e.g. SN modification required) to MN, asking MN to inform UE to deactivate the SCG. After receiving the message from SN, the MN can generate a message (RRC or MAC CE or DCI) and sends to UE. This message can inform UE to deactivate SCG. Upon receiving the message from MN, the UE can deactivate the SCG and stops UL/DL data transmission. MN may also send a response message to SN, informs SN that SCG deactivation is successfully executed.

Later on, when SN receives DL data from core network (e.g. on SN terminated SCG bearer), the SN can decide to activate the SCG. Then SN sends a message (e.g. SN modification required) to MN, asking MN to inform UE to activate the SCG. After receiving the message from SN, the MN can generate a message (RRC or MAC CE or DCI) and sends to UE. This message can inform UE to activate SCG. Upon receiving the message from MN, the UE can activate the SCG and start UL/DL data transmission. MN may also send a response message to SN, informs SN that SCG activation is successfully executed.

In a third example, for an EN-DC UE, when the SCG is in deactivated state, network decides to trigger SN change procedure (e.g. based on UE's measurement report), then SN generates a SN RRC message with reconfigurationWithSync field. However, SN may decide not to activate the SCG during this procedure. The SN can include a field in SN RRC message, indicates the UE should maintain SCG in deactivated state.

The SN can send SN RRC message to MN, and MN can generate the MN RRC message (contains SN RRC message)

and sends to UE. After receiving the message, the UE can store the new SN RRC configuration. However, since the message indicates the UE can maintain SCG in deactivated state, the UE may not perform RACH procedure towards target PSCell.

Later on, when UE receives the SCG activation command from network, the UE can trigger RACH procedure towards PSCell, and activates the SCG.

In a fourth example, for an EN-DC UE, when the SCG is in deactivated state, network decides to trigger SN change procedure (e.g. based on UE's measurement report), then SN generates a SN RRC message with reconfigurationWithSync field. The SN can send SN RRC message to MN, and MN can generate the MN RRC message (contains SN RRC message) and sends to UE. However, MN decides not to activate the SCG during this procedure. The MN can include a field in MN RRC message, indicating that the UE can maintain SCG in deactivated state. MN may also inform SN that SCG is still in deactivated state, so that no data transmission via SCG is expected.

After receiving the message, the UE can store the new SN RRC configuration. In addition, since the message indicates the UE should maintain SCG in deactivated state, the UE may not perform RACH procedure towards target PSCell.

Later on, when UE receives the SCG activation command from network, the UE can trigger RACH procedure towards PSCell, and activates the SCG.

Figure 3:
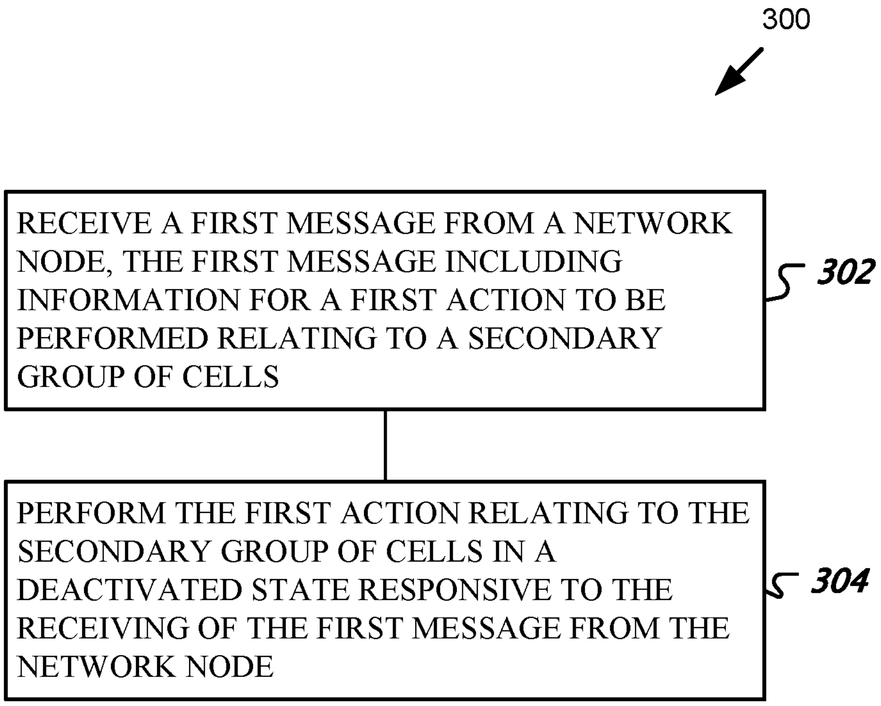
FIG. 3 is a block diagram of an example method for wireless cell activation and deactivation.

FIG. 3 is a block diagram 300 of an example method for wireless cell activation and deactivation. The method can include receiving, by a terminal, a first message from a network node, the first message including information for a first action to be performed relating to a secondary group of cells (block 302). The first message can include information relating to an action to be performed relating to a SCG, such as the first message 106 and 210 in FIGS. 1-2 as described herein. In some instances, the network node can include a SN (e.g., SN 204) that can transmit the first message responsive to receiving an indication (e.g., indication 208) that the SN allowed to trigger SCG activation/deactivation as described herein.

The method can also include performing, by the terminal, the first action relating to the secondary group of cells in a deactivated state responsive to the receiving of the first message from the network node (block 304). The first action as described herein can include a first action (e.g., performance of a first action 108, 212) relating to SCG activation/deactivation as described herein.

In some embodiments, the information for the first action to be performed indicates whether the terminal is allowed to trigger a secondary cell group activation procedure by performing a random-access channel (RACH) procedure on a primary secondary cell (PSCell).

In some embodiments, the information for the first action to be performed includes a threshold data buffer size.

In some embodiments, the terminal is configured to perform the first action relating to a secondary group of cells activation procedure responsive to an uplink data buffer size of a radio bearer of the terminal is larger than the threshold data buffer size.

In some embodiments, the information for the first action to be performed includes a validity timer with dedicated RACH resources on a PSCell.

In some embodiments, the validity timer is initiated responsive to the secondary group of cells transitioning into the deactivated state, and wherein a length of the validity timer is equal to a received timer value.

In some embodiments, the terminal is configured to trigger a contention-free random-access procedure towards the PSCell on the dedicated RACH resources for the terminal to trigger a secondary group of cells activation procedure prior to expiration of the validity timer.

In some embodiments, the terminal is configured to release the dedicated RACH resources or trigger a contention-based random-access procedure towards the PSCell responsive to the validity timer expiring.

In some embodiments, the information for the first action to be performed indicates whether the terminal is to maintain a configured secondary group of cells physical uplink control channel (PUCCH) resource and scheduling request (SR) resource after an expiration of a secondary cell group (SCG) time alignment timer (TAT).

In some embodiments, the terminal is configured use a pre-defined default PUCCH and SR resource when triggering a secondary group of cells activation procedure.

In some embodiments, the information for the first action to be performed indicates whether the terminal is to perform a radio link monitoring (RLM) action for the PSCell when the secondary group of cells are in the deactivated state.

In some embodiments, the first action includes performing the RLM action for the PSCell based on all transmitted synchronization signal block (SSB) indexes in the PSCell.

In some embodiments, the terminal is configured to send a secondary group of cells failure report to the network node comprising a master node (MN), wherein the secondary group of cells failure report is sent responsive to determining that a radio link failure (RLF) occurred on the PSCell, and wherein the secondary group of cells failure report includes measurements results of secondary cell group serving cells and a set of neighbor cells.

In some embodiments, the information for the first action to be performed includes an indication of whether the terminal is to perform a radio resource management (RRM) measurement on a serving cell of the secondary group of cells when the secondary group of cells are in the deactivated state.

In some embodiments, the information for the first action to be performed includes an indication of a set of SN configured RRM measurements to be performed when the secondary group of cells are in the deactivated state.

In some embodiments, the information for the first action to be performed includes an indication of whether the terminal is to send a notification message to either a master node (MN) or a secondary node (SN) when the measurement result relating to the PSCell is lower than a threshold.

In some embodiments, the terminal is configured not to send a notification message to the network node when the measurement result relating to the PSCell is lower than a threshold, and wherein the terminal is configured to respond to the network node when the measurement result relating to the PSCell is lower than the threshold or reject the resume request by sending a message including a corresponding cause value when receiving the resume request relating to secondary cell group and the measurement result relating to the PSCell is lower than the threshold.

In some embodiments, the notification message or response message sent by the terminal includes the measurement result relating to the PSCell , wherein the message also includes a measurement result relating to a serving cell of the secondary group of cells and/or a measurement result relating to a neighbor cell of the secondary group of cells.

In some embodiments, the terminal is configured to trigger a SN release procedure, an SN change procedure, and/or a PSCell change procedure responsive to sending the notification message or response message to the network node.

In some embodiments, the network node comprises a secondary node (SN) configured to receive a second message from a master node (MN), wherein the second message includes an indication of whether the SN is allowed to trigger a secondary cell group deactivation procedure and/or a secondary cell group activation procedure to the terminal.

In some embodiments, the network node triggers a SN RRC reconfiguration procedure while the secondary group of cells are in the deactivated state, and wherein the network node sends a third message to the terminal to keep the secondary group of cells in the deactivated state.

In some embodiments, the terminal is configured to delay a RACH procedure towards a PSCell until initiation of a secondary group of cells activation procedure.

Example Wireless System

Figure 4:
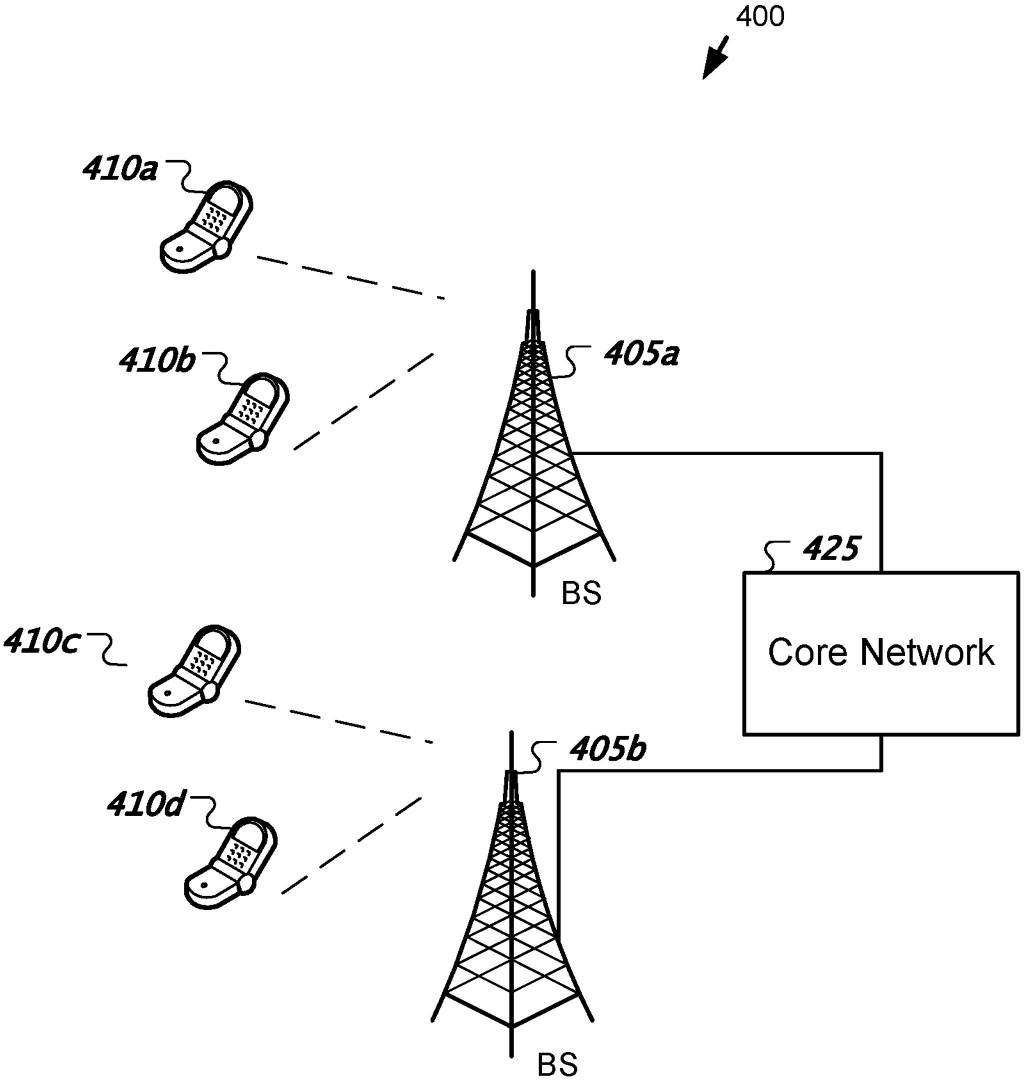
FIG. 4 shows an example of a wireless communication system where techniques in accordance with one or more embodiments of the present technology can be applied.

FIG. 4 shows an example of a wireless communication system where techniques in accordance with one or more embodiments of the present technology can be applied. A wireless communication system 400 can include one or more base stations (BSs) 405*a*, 405*b*, one or more wireless devices or terminals 410*a*, 410*b*, 410*c*, 410*d*, and a core network 425. A base station 405*a*, 405*b* can provide wireless service to wireless devices 410*a*, 410*b*, 410*c* and 410*d* in one or more wireless sectors. In some implementations, a base station 405*a*, 405*b* includes directional antennas to produce two or more directional beams to provide wireless coverage in different sectors. The base station may implement functionalities of a scheduling cell or a candidate cell, as described in the present document.

The core network 425 can communicate with one or more base stations 405*a*, 405*b*. The core network 425 provides connectivity with other wireless communication systems and wired communication systems. The core network may include one or more service subscription databases to store information related to the subscribed wireless devices 410*a*, 410*b*, 410*c*, and 410*d*. A first base station 405*a* can provide wireless service based on a first radio access technology, whereas a second base station 405*b* can provide wireless service based on a second radio access technology. The base stations 405*a* and 405*b* may be co-located or may be separately installed in the field according to the deployment scenario. The wireless devices 410*a*, 410*b*, 410*c*, and 410*d* can support multiple different radio access technologies.

In some implementations, a wireless communication system can include multiple networks using different wireless technologies. A dual-mode or multi-mode wireless device includes two or more wireless technologies that could be used to connect to different wireless networks.

Figure 5:
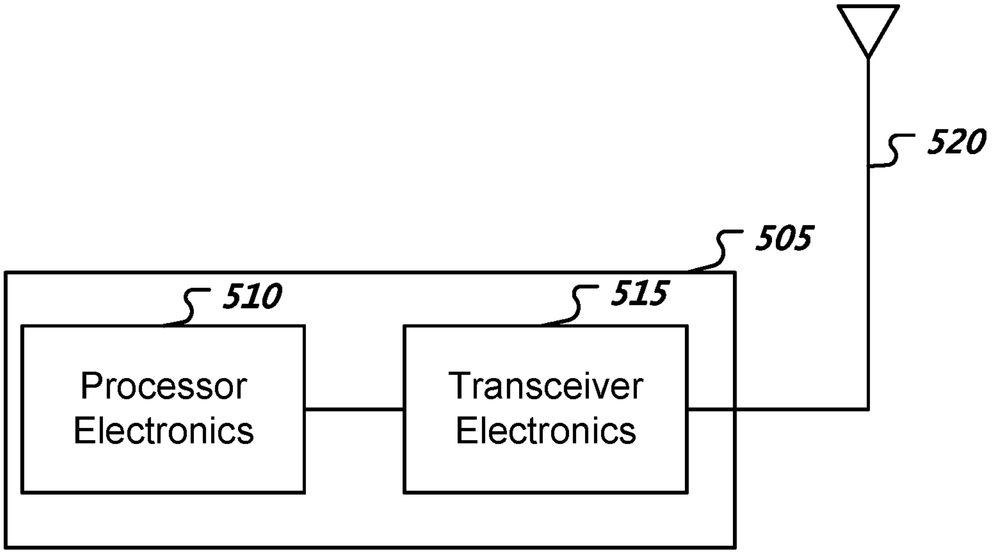
FIG. 5 is a block diagram representation of a portion of a hardware platform.

FIG. 5 is a block diagram representation of a portion of a hardware platform. A hardware platform 505 such as a network node or a base station or a terminal or a wireless device (or UE) can include processor electronics 510 such as a microprocessor that implements one or more of the techniques presented in this document. The hardware platform 505 can include transceiver electronics 515 to send and/or receive wired or wireless signals over one or more communication interfaces such as antenna 520 or a wireline interface. The hardware platform 505 can implement other communication interfaces with defined protocols for transmitting and receiving data. The hardware platform 505 can include one or more memories (not explicitly shown) configured to store information such as data and/or instructions. In some implementations, the processor electronics 510 can include at least a portion of the transceiver electronics 515. In some embodiments, at least some of the disclosed techniques, modules or functions are implemented using the hardware platform 505.

Conclusion

The disclosed and other embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable sub combination. Moreover, although features may be described above as acting in certain combinations and even initially claimed as such, one or more features from a claimed combination can in some cases be excised from the combination, and the claimed combination may be directed to a sub combination or variation of a sub combination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described, and other implementations, enhancements and variations can be made based on what is described and illustrated in this patent document.

What is claimed is:

1. A method for wireless communication, comprising:

receiving, by a terminal, a first message from a network node, the first message including information for a first action to be performed relating to a secondary cell group (SCG);

wherein the information for the first action to be performed indicates whether the terminal is to perform a radio link monitoring (RLM), action for a primary secondary cell, PSCell, when the SCG is in a deactivated state; and performing, by the terminal, the first action relating to the SCG in a deactivated state responsive to the receiving of the first message from the network node;

wherein the information for the first action to be performed includes a field, wherein the field is set false indicating the terminal is to stop performing the RLM for the primary secondary cell (PSCell) when the SCG is deactivated, wherein the field is set true indicating the terminal is to perform the RLM action for the PSCell when the SCG is in the deactivated state.

2. The method of claim 1, comprising:

sending, by the terminal, a secondary group of cells failure report to the network node comprising a master node (MN), wherein the secondary group of cells failure report is sent responsive to determining that a radio link failure (RLF) occurred on the PSCell, and wherein the secondary group of cells failure report includes measurements results of SCG serving cells and a set of neighbor cells.

3. The method of claim 1, comprising:

receiving, by the terminal, a second message from the network node to keep the SCG in the deactivated state when a SN RRC reconfiguration procedure is triggered while the SCG is in the deactivated state.

4. The method of claim 3, wherein the terminal is configured to delay a RACH procedure towards the PSCell until initiation of a SCG activation procedure.

5. The method of claim 1, including:

sending, by the terminal, a secondary group of cells failure report to the network node comprising a master node (MN), wherein the secondary group of cells failure report is sent responsive to determining that a radio link failure (RLF) occurred on the PSCell, and wherein the secondary group of cells failure report includes measurements results of SCG serving cells and a set of neighbor cells.

6. The method of claim 1, wherein the terminal is configured to delay a RACH procedure towards a primary secondary cell, PSCell, until initiation of secondary cell group, SCG, activation procedure.

7. An apparatus for wireless communication comprising processor electronics that is configured to cause a terminal to carry out a method comprising:

receiving, by the terminal, a first message from a network node, the first message including information for a first action to be performed relating to a secondary cell group (SCG);

wherein the information for the first action to be performed indicates whether the terminal is to perform a radio link monitoring, (RLM), action for a primary secondary cell, PSCell, when the SCG is in a deactivated state; and performing, by the terminal, the first action relating to the SCG in a deactivated state responsive to the receiving of the first message from the network node;

wherein the information for the first action to be performed includes a field, wherein the field is set false indicating the terminal is to stop performing the RLM for the primary secondary cell (PSCell) when the SCG is deactivated, wherein the field is set true indicating the terminal is to perform the RLM action for the PSCell when the SCG is in the deactivated state.

8. The apparatus of claim 7, wherein the terminal is configured to send a secondary group of cells failure report to the network node comprising a master node (MN), wherein the secondary group of cells failure report is sent responsive to determining that a radio link failure (RLF) occurred on the PSCell, and wherein the secondary group of cells failure report includes measurements results of SCG serving cells and a set of neighbor cells.

9. The apparatus of claim 8, wherein the method further include:

sending a secondary group of cells failure report to the network node comprising a master node (MN), wherein the secondary group of cells failure report is sent responsive to determining that a radio link failure (RLF) occurred on the PSCell, and wherein the secondary group of cells failure report includes measurements results of SCG serving cells and a set of neighbor cells.

10. The apparatus of claim 7, wherein the method includes:

receiving, by the terminal, a second message from the network node to keep the SCG in the deactivated state when a SN RRC reconfiguration procedure is triggered while the SCG is in the deactivated state.

11. The apparatus of claim 10, wherein the terminal is configured to delay a RACH procedure towards the PSCell until initiation of a SCG activation procedure.

12. The apparatus of claim 7, wherein the terminal is configured to delay a RACH procedure towards a primary secondary cell, PSCell, until initiation of secondary cell group, SCG, activation procedure.

13. A non-transitory computer readable medium having code stored thereon, the code when executed by a processor, causing the processor to implement a method comprising:

receiving, by a terminal, a first message from a network node, the first message including information for a first action to be performed relating to a secondary cell group (SCG);

wherein the information for the first action to be performed indicates whether the terminal is to perform a radio link monitoring, (RLM), action for a primary secondary cell, PSCell, when the SCG is in a deactivated state; and performing, by the terminal, the first action relating to the SCG in a deactivated state responsive to the receiving of the first message from the network node;

wherein the information for the first action to be performed includes a field, wherein the field is set false indicating the terminal is to stop performing the RLM for the primary secondary cell (PSCell) when the SCG is deactivated, wherein the field is set true indicating the terminal is to perform the RLM action for the PSCell when the SCG is in the deactivated state.

14. The non-transitory computer readable medium of claim 13, wherein the terminal is configured to send a secondary group of cells failure report to the network node comprising a master node (MN), wherein the secondary group of cells failure report is sent responsive to determining that a radio link failure (RLF) occurred on the PSCell, and wherein the secondary group of cells failure report includes measurements results of SCG serving cells and a set of neighbor cells.

15. The non-transitory computer readable medium of claim 14, wherein the terminal is configured to delay a RACH procedure towards a primary secondary cell, PSCell, until initiation of secondary cell group, SCG, activation procedure.

16. The non-transitory computer readable medium of claim 13, wherein the method includes:

receiving, by the terminal, a second message from the network node to keep the SCG in the deactivated state when a SN RRC reconfiguration procedure is triggered while the SCG is in the deactivated state.

17. The non-transitory computer readable medium of claim 13, wherein the terminal is configured to delay a RACH procedure towards the PSCell until initiation of a SCG activation procedure.

18. The non-transitory computer readable medium of claim 13, wherein the method further include:

sending a secondary group of cells failure report to the network node comprising a master node (MN), wherein the secondary group of cells failure report is sent responsive to determining that a radio link failure (RLF) occurred on the PSCell, and wherein the secondary group of cells failure report includes measurements results of SCG serving cells and a set of neighbor cells.

* * * * *